US011132345B2

(12) United States Patent
Bain

(10) Patent No.: US 11,132,345 B2
(45) Date of Patent: *Sep. 28, 2021

(54) REAL TIME INDEXING

(71) Applicant: Business Partners Limited, London (GB)

(72) Inventor: Simon Ian Bain, Berwickshire Northlumberland (GB)

(73) Assignee: Business Partners Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,436

(22) Filed: Nov. 26, 2019

(65) Prior Publication Data

US 2020/0201832 A1    Jun. 25, 2020

Related U.S. Application Data

(63) Continuation of application No. 14/959,400, filed on Dec. 4, 2015, now Pat. No. 10,515,061.

(30) Foreign Application Priority Data

Dec. 5, 2014    (EP) ........................................ 1421674
Nov. 30, 2015   (WO) ................. PCT/GB2015/053663

(51) Int. Cl.
*G06F 16/00*    (2019.01)
*G06F 7/00*     (2006.01)
(Continued)

(52) U.S. Cl.
CPC ........ *G06F 16/2228* (2019.01); *G06F 16/221* (2019.01); *G06F 16/285* (2019.01)

(58) Field of Classification Search
CPC .. G06F 16/2228; G06F 16/221; G06F 16/285; G06F 16/134; G06F 16/31; G06F 16/41; G06F 16/61; G06F 16/71
(Continued)

(56) References Cited

U.S. PATENT DOCUMENTS 6,167,369 A    12/2000 Schulze
6,377,946 B1    4/2002 Okamoto et al.
(Continued)

OTHER PUBLICATIONS

Ikeda T. et al., "TRMeister: A DBMS with High-Performance Full-Text Search Functions," Data Engineering, 2005, pp. 958-967.
(Continued)

*Primary Examiner* — Usmaan Saeed
*Assistant Examiner* — Raquel Perez-Arroyo
(74) *Attorney, Agent, or Firm* — Banner & Witcoff, Ltd.

(57) ABSTRACT

Methods and systems for generating a database index and searching the database index are described herein. In one aspect this may include receiving an item of database data, wherein the item of database data comprises a sequence of data elements. Groups of data elements may be identified within the received item of database data. If any one or more of the identified groups of data elements have not been previously identified within the item of database data and/or previous items database data then the one or more identified group may be stored as index entries in a database index. Information describing the sequence of the groups of neighbouring data elements may be recorded within the database index as they are located within the item of database data. The database index may be searched based on a received search term comprising a sequence of data elements.

20 Claims, 4 Drawing Sheets

(51) Int. Cl.
*G06F 16/22* (2019.01)
*G06F 16/28* (2019.01)

(58) Field of Classification Search
USPC .......................................................... 707/741
See application file for complete search history.

(56) References Cited

U.S. PATENT DOCUMENTS

| | | |
|---|---|---|
| 6,470,334 B1 | 10/2002 | Umemoto |
| 7,284,009 B2 | 10/2007 | Perrow |
| 2003/0033297 A1* | 2/2003 | Ogawa ................... G06F 16/319 |
| 2003/0200211 A1 | 10/2003 | Tada et al. |
| 2004/0230571 A1* | 11/2004 | Robertson ............... G06F 16/22 |
| 2012/0197900 A1* | 8/2012 | Mandre ............... G06F 16/2246 |
| | | 707/743 |
| 2012/0198214 A1* | 8/2012 | Gadre ................... G06F 9/3004 |
| | | 712/225 |
| 2013/0024645 A1* | 1/2013 | Cheriton ................. G06F 12/02 |
| | | 711/206 |
| 2014/0207836 A1* | 7/2014 | Mundarath ............. G06F 7/026 |
| | | 708/201 |
| 2015/0310047 A1 | 10/2015 | Zhou |

OTHER PUBLICATIONS

International Search Report—Application No. PCT/GB2015/053663.

* cited by examiner

REAL TIME INDEXING

CROSS-REFERENCE TO RELATED APPLICATIONS

This application is a continuation of Ser. No. 14/959,400, filed Dec. 4, 2015, and having the same title, which itself claims priority to United Kingdom application no. 1421674.1, filed Dec. 5, 2014, entitled "Real Time Document Indexing," and PCT application no. PCT/GB2015/053663, filed Nov. 30, 2015, entitled "Real Time Indexing," each of which is herein incorporated by reference for all purposes.

FIELD

Aspects described herein relate to a database system and a method for building a database index and using the database index to retrieve data from the database system.

BACKGROUND

Databases and especially relational databases provide convenient, fast and flexible access to data sets. As a data set grows it becomes more difficult and slower to search every item in order to retrieve one or more items of data. Database indexes are used to speed up this process, as an index can be searched faster than the indexed data. However, indexes have their own additional processing costs by adding to the number of writes and storage requirements.

A document index may be built by parsing a document, identifying individual words or keywords and adding an entry in the index identifying each document for every word. Therefore, for every word found in any document the index lists all documents which contain that word or keyword. Alternatively, each document may have a row that identifies every word or keyword that it contains. One drawback of this approach is that words are variable is size and so require different storage space. This in turn means that the words must be stored using a field type (e.g. CLOB or VARCHAR) that can accommodate different sized words. Such field types can require 256 or 2028 bits, for example, further increase storage requirements and slow index generation and searching.

With the rise of large data sets and "Big Data", indexing has become an important issue to organizations. Even with a well-designed index, building such an index can require large computing resources and have large storage requirements. One approach is to index a database when it is off line or at a time when it is rarely used instead of indexing in real time as data is added to the database. Whilst this can alleviate some burden on the system when data needs to be accessed, this can cause search results to become outdated and even incorrect. Furthermore, the rise of huge amounts of data to be indexed leads to needing longer index updates and ever increasing management resources.

Therefore, there is required a method and system that overcomes these problems.

SUMMARY

A database index is built as data is added to the database. Preferably, the database is a column, columnar or column-oriented database but other database types may be used. The data added to the database is analysed and divided into groups or elements. Each element may be an individual character or figure or groups of two or more neighbouring characters or figures (or any other content type). Duplicate entries are not added to the index (although existing entries may be associated with the incoming data) but new entries are added. The index entries are provided with, stored with or associated with a position of the element within the original data (or multiple items of data). Each entry in the index may be stored with or associated with a particular data item, document or digital work that is stored within the database or other data storage (e.g. file system). For data elements already stored in the database, the index may be updated by adding a reference or identifier of the new digital work to the existing data element. In other words, data elements may be associated with one or more digital works (or items) within the database. The digital work or item may be retrieved from the database based on the reference or identifier stored in the index.

The index may be searched by receiving a search term and dividing the search term into search term elements in a similar way to the original data. The index is searched for each search term element. Where all search term elements are found in the index and associated with the same digital work or data item then a positive result or search hit may be reported. The identified digital work or data item may be retrieved. The positive result may only be returned or reported if the positions of all of the found search term elements correspond to the position of those elements in the search term. In other words, the positions of the elements in the index must be consecutive or neighbouring.

In accordance with a first aspect there is provided a method for generating a database index, the method comprising the steps of: receiving an item of database data, wherein the item of database data comprises a sequence of data elements; identifying groups of data elements within the received item of database data; if any one or more of the identified groups of data elements have not been previously identified within the item of database data and/or previous items database data then storing the one or more identified group as index entries in a database index; and recording within the database index information describing the sequence of the groups of neighbouring data elements as they are located within the item of database data. Therefore, a more effective and efficient database index may be built. The computer system as a whole and any network may be operated more effectively and efficiently.

Preferably, the groups of data elements may be groups of two or more neighbouring data elements. Therefore, it becomes easier and faster to search the index for matching patterns.

Advantageously, the last data element of at least one identified group of neighbouring data elements may be included or be present as the first data element in a following identified group of neighbouring data elements. This further improves search effectiveness.

Advantageously, the method may further comprise the step of storing the received item of database data in a database. This may be part of the same process as building the database index or separate from it.

Preferably, the received item of database data may be received before it is stored within the database. In other words, the index is built before or at the same time that the database data are added.

Preferably, the database may be a columnar database.

Optionally, the groups of data elements or neighbouring data elements may be processed in parallel by a plurality of processing threads. This further reduces the time necessary to build the index.

Optionally, the database index may be stored as an ordered array or another other type of array. This further improves searching efficiency and storage.

Advantageously, the database index may be stored in memory. This may be RAM or other non-persistent memory. The index may also be stored in persistent memory, particularly when the database is offline.

Preferably, each group of data elements may be stored using no more than 8 bits. Other size elements may be used.

Optionally, the item of database data may be any one or more of: digital work, a document, an email, a note, a calendar entry, text, portable document format file, a mark-up language document, computer source code, a word processing document, ASCII, a spreadsheet, an XML document, a visual presentation document, a website, financial data, customer data, employee data or product data.

Optionally, determining if any one or more of the identified groups of data elements have not been previously identified may further comprise the step of searching the database index for index items of each identified group of data elements within the received item of database data.

Optionally, recording within the database index information describing the sequence of the groups of data elements as they are located within the item of database data may further comprise associating the index entry of each identified group of data elements with a position identifier of the group within the item of database data.

Preferably, if any one of the identified groups of data elements has been previously stored as an index entry in the database index then the method may further comprise associating with the previously stored index entry a further position identifier of the group within the item of database data.

According to a second aspect, there is provided a method for searching a database comprising the steps of: receiving a search term, wherein the search term comprises a sequence of data elements; identifying groups of data elements within the received searched term; matching the identified groups of data elements with index elements within a database index, wherein the database index includes information describing the sequence of the groups of data elements as they are located within one or more items of database data; and if a plurality of matched identified groups have the same sequence within an item of database data as the sequence in the search term then providing an output including an indication of the item of database data.

Preferably, the groups of data elements may be groups of two or more neighbouring data elements.

Advantageously, the database may be a columnar database.

Optionally, the information describing the sequence of the groups of data elements as they are located within one or more items of database data may be a position identifier associated with each index element.

Optionally, the comparing step may be carried out for different identified groups at the same time.

Preferably, an output including an indication of the item of data may be provided only when all identified groups of data elements are found in the database index associated with the same item of database data. The output may be provided visually or as a signal or message.

Optionally, the database index may be stored as a plurality of multi-dimensional arrays.

Advantageously, the database index may be stored and searched in memory.

According to a third aspect, there is provided a system or computer system for generating a database index, the system comprising: at least one processor; memory storing instructions that, when executed by the at least one processor, cause the apparatus to perform the steps of any previously described method.

The methods described above may be implemented as a computer program comprising program instructions to operate a computer. The computer program may be stored on a computer-readable medium.

The system or computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment described herein.

BRIEF DESCRIPTION OF THE FIGURES

Aspects described herein may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION

As the volume of data in a database grows, the efficiency of finding and retrieving data from the database can decrease. Indexes improve the retrieval efficiency but can consume computer resources, including processing power, memory and persistent storage as they are populated. Therefore, the process of building and maintaining a database index can have a significant impact on the effectiveness of a database system, its upper data limits and the time taken to store and retrieve data. This in turn, has an impact on the amount of work that a computer or computer network needs to process in order to run and manage a growing database. A poorly designed and implemented database index can have an adverse impact on the operation, efficiency and effectiveness of the computer system that manages the database.

Figure 1:
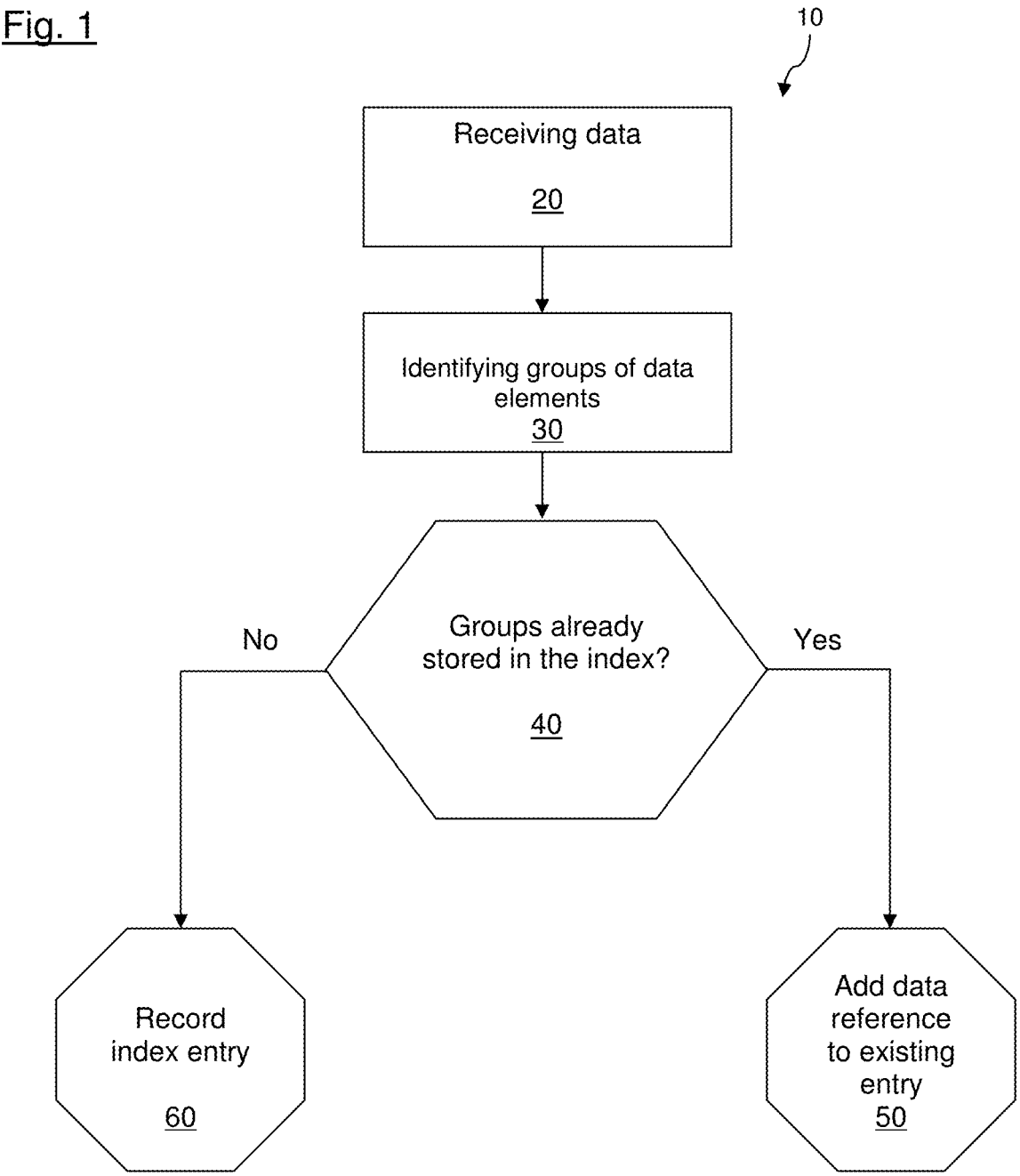
FIG. 1 shows flowchart of a method for building a database index.

FIG. 1 shows a flowchart of a method 10 for building a database index. Data are received at step 20. These data may be received as they are intercepted during a procedure for adding the data to a database. The data may take any particular form. For example, the data may be free text, numerical data, digital works or documents. The incoming or received data are analysed and groups of data elements within the data are identified at step 30. This identification step 30 may divide the data to form the data elements, for example.

An existing database index (if already formed) is checked to determine if particular data elements exist in the index. These may have been added for different data or documents or earlier portions of the current received data. If the data already exists then the entry is updated at step 50 to include a reference or identifier of the current data or document and the position of the data element within the data. If the entry or data element does not appear in the index then the entry is created. Again, the position and data reference or identifier is stored with or otherwise associated with the index entry. The process repeats until the complete incoming data or document has been indexed.

Figure 2:
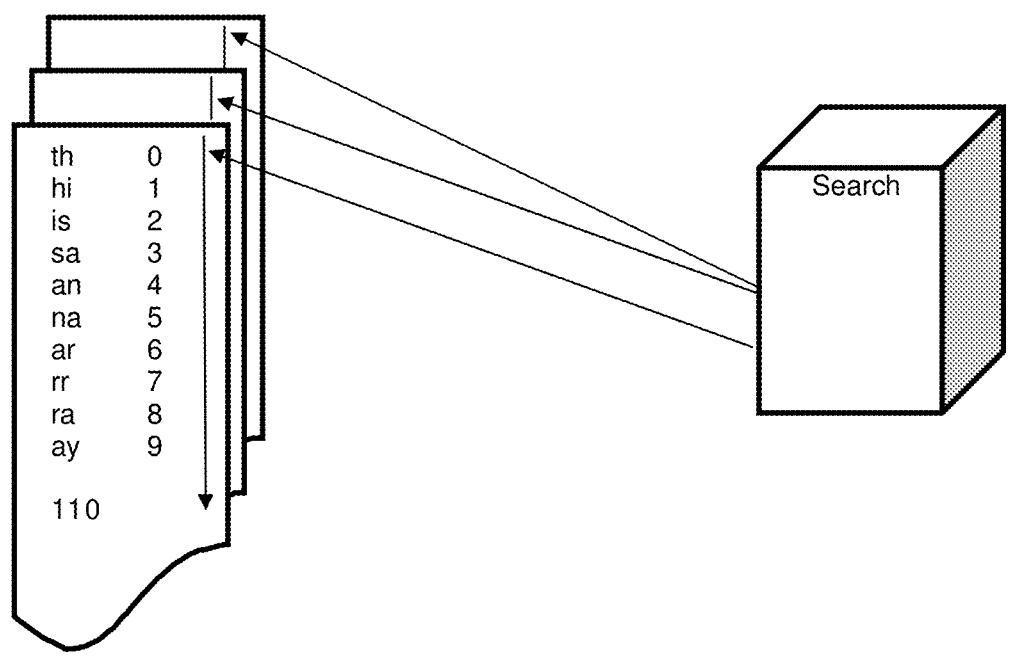
FIG. 2 shows a schematic diagram of the database index of FIG. 1.

FIG. 2 shows a schematic diagram of the database index 110 described with reference to FIG. 1. The index 110 is stored as an ordered array within computer memory (e.g. RAM). Each array may be simultaneously accessed and indexed, which allows faster and more efficient searching.

Figure 3:
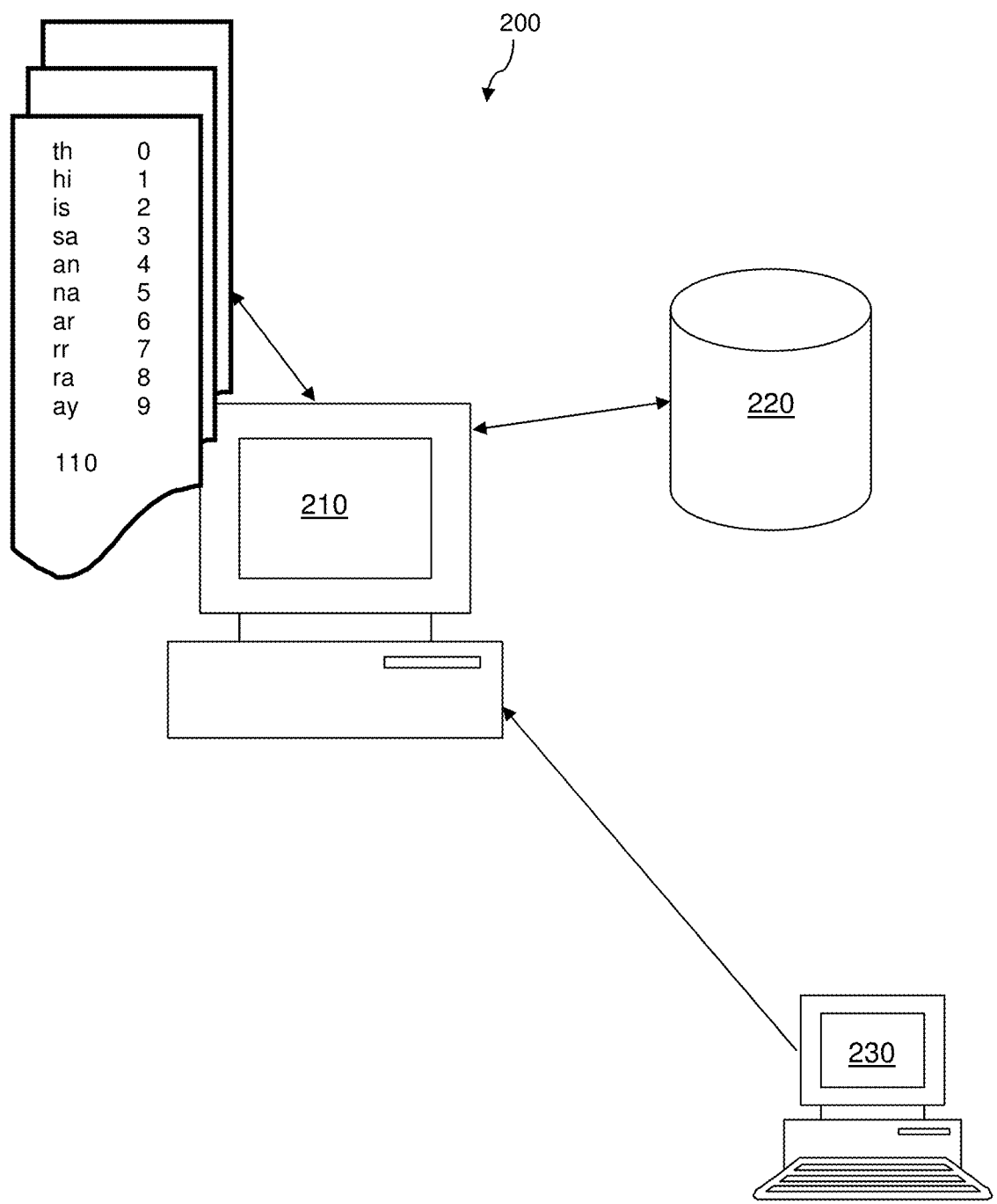
FIG. 3 shows a schematic diagram of a system used to implement the method of FIG. 1.

FIG. 3 shows a schematic diagram of a computer system 200 used to carry out method 10 and also search existing indexes 110 and retrieve data from a corresponding database 220. A server 210 performs database management functions and builds one or more indexes 110 for data that is stored in the database 220. Data may be received from one or more network nodes 230 (e.g. other servers). Network nodes may also submit searches, which are processed by the server 210. When a document or data item is found within the index during a search then the corresponding data item may be retrieved by the server 210 and sent to the requesting network node 230. The network may be an internal network or an external network like the internet. The searches may be secured or unsecured, for example. Any number or multiple servers 210 and/or network nodes 230 may be used. The interface may include client-server or browser-based systems, for example.

In one example embodiment, data are added to a columnar database or column-oriented database within a database system. The database management system may be SAP Sybase IQ, for example, although other systems may also be suitable. An index is built as the data are added by intercepting calls to the system. The index is built as the data passes through the system. Therefore, this reduces the effect on the speed or availability of the database system (reading or writing). The architecture and design of the index contribute to this effect.

By using both this architecture and index design, data may be indexed in real-time and the system is able process and index data from multiple sources concurrently and at higher speeds or using few computing resources than current practices.

The following provides a simplified example of data being added to the database and an index being built. The system receives information to be indexed and breaks it down into data elements. This information is then stored. The stored data are the content and positions are assigned to this content.

An example item of data (or content) to be added to the database is Peter Delf (10 characters) and this may be stored in the index as:

| | |
|---|---|
| pe | 0 |
| et | 1 |
| te | 2 |
| er | 3 |
| rd | 4 |
| de | 5 |
| el | 6 |
| lf | 7 |

The numbers indicate element position in the data or index. After normalisation (e.g. the removal of capitals and spaces), the original size of the data has been increased from 10 characters to 16 characters. However, searching the database may be achieved more quickly because instead of looking for whole or parts of keywords, the system can start to look for patterns that have been placed in a specific sequence.

Pairs of neighbouring data elements are stored in the index. For example, the pair "et" (1) is stored as well as the pair "pe" (0) because the "e" supersedes "p" as well as preceding "t".

A further term or item of content, may be added to the index: "CFO Peter Delf has been given". This may be stored in the index as:

| | |
|---|---|
| cf | 8 |
| fo | 9 |
| ha | 10 |
| as | 11 |
| sb | 12 |
| be | 13 |
| ee | 14 |
| en | 15 |
| ng | 16 |
| gi | 17 |
| iv | 18 |
| ve | 19 |
| en | 20 |

Duplicate data are not added to the index. The index size is now at 42 characters in size, instead of 39 characters that made up the total indexed data. This demonstrates that the index size is not increasing at the same rate as the content. By not duplicating patterns but by storing them in a designated area, the size of the index can be restricted. Additionally, the speed of the search may be increased. If we take this approach and examine examples of use, then it can be seen where that an increase in speed and a decrease required storage resources can start to become apparent.

Current databases have limitations in terms of field capabilities, sorting and memory handling. The index, described above, may be placed in to its own data store. The data store designed to house the index has been developed to increase the speed of insertions and searches of the indexed data.

In this example, the data store comprises a number of multi-dimensional arrays. Each multi-dimensional array holds a unique sequence of items. The data store may be resident in memory at all times that the index is running. When the system is shutdown then these data may be transferred to a non-ephemeral storage medium such as a standard database or computer disk volume.

The arrays may be made up from a tabular design allowing for the index to sit within a small and easily searched array structure, which is ordered and vertical in nature. This makes it easier to navigate from top to bottom. This differs from current index stores, which are stored horizontally and in hashed tables with relational links. This horizontal storage makes it harder to navigate across items during a search. Furthermore, hashing can create duplicate entries that give rise to false positive matches, as a single hash can be created for totally separate items. For example, the hash for the word 'this' can also be the same as the hash for the word 'bird'.

Inputting data to this index not only becomes faster but also non data-type specific, as patterns are submitted and not necessarily characters. Additionally, the searching of the index may be improved because at any one time, a search may only ever search through a maximum of 8 bits (non Unicode). Current indexes may use database CLOB or VARCHAR fields and these must be searched in full during keyword index searching. Either of these formats may have in excess of 256 bytes or 2048 bits (in the case of a CLOB this could go in to the MB storage size). In this example embodiment, multiple searches on the index (two or three, for example) may be required but these may be significantly faster and so the required time to obtain search results may be significantly reduced.

The following provides a further example of an index being built as data is stored within a database. Again, simple short data entries are used for illustrative purposes.

Document 1 Contents:
Debs Jayne Bain
Document 2 Contents:
Debs Bain
Document 3 Contents:
Debs Junior
Index Content Array Data

| Content | Position |
|---------|----------|
| de | 1 |
| eb | 2 |
| bs | 3 |
| sj | 4 |
| ja | 5 |
| ay | 6 |
| yn | 7 |
| ne | 8 |
| eb | 9 |
| ba | 10 |
| ai | 11 |
| in | 12 |
| ju | 13 |
| un | 14 |
| ni | 15 |
| io | 16 |
| or | 17 |

This means that for Document 1 we have built an index comprising

| | | |
|---|---|---|
| Sequence | 1 | Position 1 |
| Sequence | 2 | Position 2 |
| Sequence | 3 | Position 3 |
| Sequence | 4 | Position 4 |
| Sequence | 5 | Position 5 |
| Sequence | 6 | Position 6 |
| Sequence | 7 | Position 7 |
| Sequence | 8 | Position 8 |
| Sequence | 9 | Position 9 |
| Sequence | 10 | Position 10 |
| Sequence | 11 | Position 11 |
| Sequence | 12 | Position 12 |

For Document 2

| | | |
|---|---|---|
| Sequence | 1 | Position 1 |
| Sequence | 2 | Position 2 |
| Sequence | 3 | Position 3 |
| Sequence | 10 | Position 4 |
| Sequence | 11 | Position 5 |
| Sequence | 12 | Position 6 |

For Document 3

| | | |
|---|---|---|
| Sequence | 1 | Position 1 |
| Sequence | 2 | Position 2 |
| Sequence | 3 | Position 3 |
| Sequence | 13 | Position 4 |
| Sequence | 14 | Position 5 |
| Sequence | 15 | Position 6 |
| Sequence | 16 | Position 7 |
| Sequence | 17 | Position 8 |

This index or indexes may be searched for particular phrases. If each element of the search term is found at consecutive positions then this indicates a match (i.e. the search term is found within the document). For example search results may include:

| Document | Search Phrase | Positions Found | Phrase Found |
|----------|---------------|-----------------|--------------|
| 1 | Debs | 1-2-3 | true |
| 2 | Debs | 1-2-3 | true |
| 3 | Debs | 1-2-3 | true |
| 1 | Debs Bain | 1-2-3-9-10-11-12 | false |
| 2 | Debs Bain | 1-2-3-4-5-6 | true |
| 3 | Debs Bain | | false |
| 1 | Jayne | 5-6-7-8 | true |
| 2 | Jayne | | false |
| 3 | Jayne | | false |
| 1 | Jayne Bain | 5-6-7-8-9-10-11-12 | true |
| 2 | Jayne Bain | | false |
| 3 | Jayne Bain | | false |
| 1 | Bain | 10-11-12 | true |
| 2 | Bain | 4-5-6 | true |
| 3 | Bain | | false |
| 1 | Junior | | false |
| 2 | Junior | | false |
| 3 | Junior | 4-5-6-7 | true |
| 1 | Debs Junior | 1-2-3 | false |
| 2 | Debs Junior | 1-2-3 | false |
| 3 | Debs Junior | 1-2-3-4-5-6-7-8 | true |

The following provides a further example of a method and system for building and using a database index. Whilst this example uses a small data set with simple entries, the same or a similar principle may be used to build much larger, and/or complex database index for larger data sets.

The following data may be stored in a database:
The quick brown fox
The quickest route
The brown fox is These data may be normalised to remove data elements that provide little or no information. An example normalisation may remove spaces and/or very common words like "a", "is", "the", etc. Normalising these data results in:
quickbrownfox
quickestroute
brownfox

TABLE 1

| quickbrownfox | | quickestroute | | | | brownfox | | |
|---|---|---|---|---|---|---|---|---|
| A | B | A | B | A | B | A | B | A | B |
| 0 | q | 0 | — | 13 | e | 0 | — | 13 | — |
| 1 | u | 1 | — | 14 | s | 1 | — | 14 | — |

TABLE 1-continued

| quickbrownfox | | quickestroute | | brownfox | | | | | |
|---|---|---|---|---|---|---|---|---|---|
| A | B | A | B | A | B | A | B | A | B |
| 2 | i | 2 | — | 15 | t | 2 | — | 15 | — |
| 3 | c | 3 | — | 16 | r | 3 | — | 16 | — |
| 4 | k | 4 | — | 17 | o | 4 | — | 17 | — |
| 5 | b | 5 | — | 18 | u | 5 | — | 18 | — |
| 6 | r | 6 | — | 19 | t | 6 | — | 19 | — |
| 7 | o | 7 | — | 20 | e | 7 | — | 20 | — |
| 8 | w | 8 | — | | | 8 | — | | |
| 9 | n | 9 | — | | | 9 | — | | |
| 10 | f | 10 | — | | | 10 | — | | |
| 11 | o | 11 | — | | | 11 | — | | |
| 12 | x | 12 | — | | | 12 | — | | |

A = Position in Column,
B = Column Content

TABLE 2

| quickbrownfox | | | quickestroute | | | brownfox | | | | | | | | |
|---|---|---|---|---|---|---|---|---|---|---|---|---|---|---|
| A | C | D | A | C | D | A | C | D | A | C | D | A | C | D |
| 0 | 1 | — | 13 | 0 | — | 0 | 1 | — | 13 | 1 | 4 | 0 | 0 | — | 13 | 0 | — |
| 1 | 1 | — | 14 | 0 | — | 1 | 1 | — | 14 | 1 | — | 1 | 0 | — | 14 | 0 | — |
| 2 | 1 | — | 15 | 0 | — | 2 | 1 | — | 15 | 1 | — | 2 | 0 | — | 15 | 0 | — |
| 3 | 1 | — | 16 | 0 | — | 3 | 1 | — | 16 | 1 | — | 3 | 0 | — | 16 | 0 | — |
| 4 | 1 | — | 17 | 0 | — | 4 | 1 | — | 17 | 1 | — | 4 | 0 | — | 17 | 0 | — |
| 5 | 1 | — | 18 | 0 | — | 5 | 0 | — | 18 | 1 | — | 5 | 1 | — | 18 | 0 | — |
| 6 | 1 | — | 19 | 0 | — | 6 | 0 | — | 19 | 1 | — | 6 | 1 | — | 19 | 0 | — |
| 7 | 1 | — | 20 | 0 | — | 7 | 0 | — | 20 | 1 | — | 7 | 1 | — | 20 | 0 | — |
| 8 | 1 | — | | — | — | 8 | 0 | — | | — | — | 8 | 1 | — | | — | — |
| 9 | 1 | — | | — | — | 9 | 0 | — | | — | — | 9 | 1 | — | | — | — |
| 10 | 1 | — | | — | — | 10 | 0 | — | | — | — | 10 | 1 | — | | — | — |
| 11 | 1 | — | | — | — | 11 | 0 | — | | — | — | 11 | 1 | — | | — | — |
| 12 | 1 | — | | — | — | 12 | 0 | — | | — | — | 12 | 1 | — | | — | — |

A = Position in Column,
C = Position of Content,
D = Position of Content Before

When the user searches for: The Brown this will be normalised to: brown
This term is found in columns:
5
6
7
8
9

Figure 4:
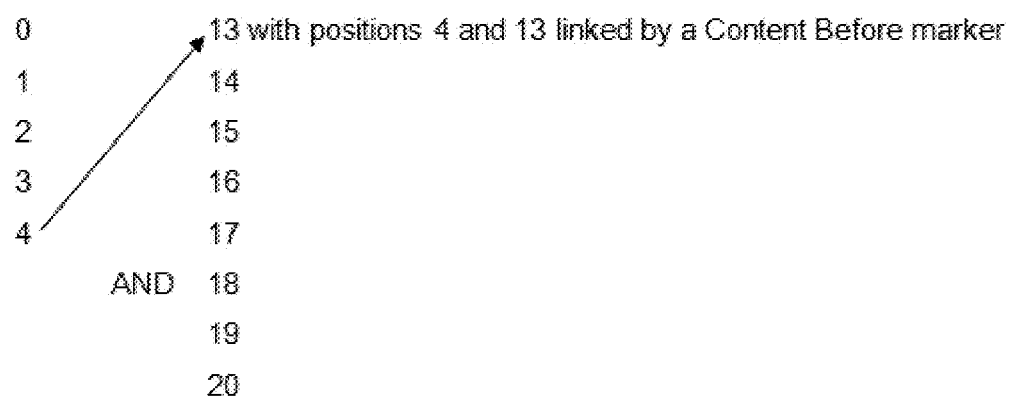
FIG. 4 shows which columns of a database a term is found in according to an example described herein.

When the user Searches for: The Quickest Route this will be normalised to: quickestroute
This term is found in columns as shown in FIG. 4.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

As will be appreciated by the skilled person, details of the above embodiment may be varied without departing from the scope of the present invention, as defined by the appended claims.

For example, different types of database and database management systems may be used.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

What is claimed is:

1. A method for generating a database index, the method comprising the steps of:
receiving, by a processor, an item of database data, wherein the item of database data comprises a sequence of data elements;
identifying, by the processor, one or more groups of data elements within the received item of database data;
when any one or more of the identified groups of data elements have not been previously identified within the item of database data and/or previous items of database data, then storing, in a hardware memory, the one or more identified groups of data elements as index entries in a database index; and
recording, within the database index, information describing a sequence of the groups of neighbouring data elements as they are located within the item of database data,
wherein data is indexed in real-time and the method comprises processing and indexing data from multiple sources concurrently, and
further comprising storing the one or more identified groups of data elements as index entries in the database index together with a content before marker that references a location in a columnar database index of a previous group of data elements that have been stored in the columnar database index when the previous group of data elements immediately precedes the identified groups of data elements in the item of database data but does not immediately precede the identified groups of data elements in the database index.

2. The method of claim 1, wherein the groups of data elements are processed in parallel by a plurality of processing threads.

3. The method of claim 1, wherein the database is a columnar database.

4. The method of claim 1, wherein the database index is stored as an ordered array.

5. The method of claim 1, wherein the database index is stored in memory.

6. The method of claim 1, wherein the item of database data and the previous items of database data are each a different document.

7. The method of claim 1, wherein the groups of data elements are groups of two or more neighbouring data elements.

8. The method of claim 1, wherein a last data element of at least one identified group of neighbouring data elements is included as the first data element in a following identified group of neighbouring data elements.

9. The method of claim 1, wherein the data elements are letters and/or numbers.

10. The method of claim 1 further comprising the step of determining that any one or more of the identified groups of data elements have not been previously identified, by searching the database index for index items of each identified group of data elements within the received item of database data.

11. The method of claim 1 further comprising the step of storing the received item of database data in a database.

12. The method of claim 1, wherein the item of database data is any one or more of: a document, an email, a note, a calendar entry, text, portable document format file, a mark-up language document, computer source code, a word processing document, ASCII, a spreadsheet, an XML document, a visual presentation document, a website, financial data, customer data, employee data or product data.

13. A system for generating a database index, the system comprising:
at least one processor;
memory storing instructions that, when executed by the at least one processor, cause the system to perform the steps of:
receiving an item of database data, wherein the item of database data comprises a sequence of data elements;
identifying one or more groups of data elements within the received item of database data;
when any one or more of the identified groups of data elements have not been previously identified within the item of database data and/or previous items of database data, then storing the one or more identified groups of data elements as index entries in a database index; and
recording, within the database index, information describing a sequence of groups of neighbouring data elements as they are located within the item of database data,
wherein data is indexed in real-time, and the instructions further cause the system to perform processing and indexing data from multiple sources concurrently, and
wherein the instructions further cause the system to perform storing the one or more identified groups of data elements as index entries in the database index together with a content before marker that references a location in a columnar database index of a previous group of data elements that have been stored in the columnar database index when the previous group of data elements immediately precedes the identified groups of data elements in the item of database data but does not immediately precede the identified groups of data elements in the database index.

14. The system of claim 13, wherein the groups of data elements are processed in parallel by a plurality of processing threads.

15. The system of claim 13, wherein the database is a columnar database.

16. The system of claim 13, wherein the database index is stored as an ordered array.

17. The system of claim 13, wherein the item of database data and the previous items of database data are each a different document.

18. The system of claim 13, wherein the groups of data elements are groups of two or more neighbouring data elements.

19. The system of claim 13, wherein a last data element of at least one identified group of neighbouring data elements is included as the first data element in a following identified group of neighbouring data elements.

20. The system of claim 13, wherein the instructions further cause the system to perform determining that any one or more of the identified groups of data elements have not been previously identified by searching the database index for index items of each identified group of data elements within the received item of database data.

* * * * *